United States Patent
Jiao

(10) Patent No.: US 10,783,083 B2
(45) Date of Patent: Sep. 22, 2020

(54) CACHE MANAGEMENT DEVICE, SYSTEM AND METHOD

(71) Applicant: STMICROELECTRONICS (BEIJING) R&D CO. LTD, Beijing (CN)

(72) Inventor: Xiao Kang Jiao, Beijing (CN)

(73) Assignee: STMICROELECTRONICS (BEIJING) RESEARCH & DEVELOPMENT CO. LTD, Beijing (CN)

( * ) Notice: Subject to any disclaimer, the term of this patent is extended or adjusted under 35 U.S.C. 154(b) by 21 days.

(21) Appl. No.: 16/268,253

(22) Filed: Feb. 5, 2019

(65) Prior Publication Data

US 2019/0251031 A1    Aug. 15, 2019

Related U.S. Application Data

(60) Provisional application No. 62/629,318, filed on Feb. 12, 2018.

(51) Int. Cl.
*G06F 12/08* (2016.01)
*G06F 12/0877* (2016.01)

(52) U.S. Cl.
CPC .. *G06F 12/0877* (2013.01); *G06F 2212/7207* (2013.01)

(58) Field of Classification Search
CPC ............ G06F 12/0871; G06F 12/0877; G06F 12/123; G06F 12/12; G06F 12/0875; G06F 12/124; G06F 2212/1021; G06F 2212/608; G06F 2212/1024
See application file for complete search history.

(56) References Cited

U.S. PATENT DOCUMENTS

| 5,802,568 | A | | 9/1998 | Csoppenszky |
| 5,835,963 | A | * | 11/1998 | Yoshioka ............ G06F 12/1054 711/207 |
| 6,098,152 | A | | 8/2000 | Mounes-Toussi |

(Continued)

OTHER PUBLICATIONS

M. K. Qureshi, D. Thompson and Y. N. Patt, "The V-Way cache: demand-based associativity via global replacement," 32nd International Symposium on Computer Architecture (ISCA'05), Madison, WI, USA, 2005, pp. 544-555. (Year: 2005).*

(Continued)

*Primary Examiner* — Khoa D Doan
(74) *Attorney, Agent, or Firm* — Seed IP Law Group LLP

(57) ABSTRACT

A cache memory is organized into a plurality of ways and a plurality of address lines. In response to a miss, the cache memory selects a way of the plurality of ways based on a first control variable indicating a way of the plurality of ways and a set of second control variables associated with the address line and with respective ways. Data associated with the miss is written to the selected way. Second control variables associated with other ways are reset if all of the second control variables indicate the associated way was recently replaced. The second control variable associated with the selected way is set to indicate the selected way was recently replaced. The first control variable is set to indicate the selected way. Current values of the first control variable and of the set of second control variables are maintained in the event of a hit.

22 Claims, 7 Drawing Sheets

(56) References Cited

U.S. PATENT DOCUMENTS

| | | | |
|---|---|---|---|
| 6,587,920 B2 | 7/2003 | Mekhiel | |
| 7,010,649 B2* | 3/2006 | Davis | G06F 12/126 |
| | | | 711/133 |
| 7,502,887 B2 | 3/2009 | Tanaka et al. | |
| 7,574,564 B2* | 8/2009 | Moyer | G06F 12/0864 |
| | | | 711/100 |
| 7,861,041 B2 | 12/2010 | Williams | |
| 9,170,955 B2 | 10/2015 | Forsyth et al. | |
| 10,176,096 B2* | 1/2019 | Vaidhyanathan | G06F 12/0804 |
| 2007/0028055 A1* | 2/2007 | Tanaka | G06F 12/124 |
| | | | 711/136 |
| 2016/0357680 A1* | 12/2016 | Hooker | G06F 8/4442 |

OTHER PUBLICATIONS

Cache Replacement Policies, Wikipedia, URL=https://en.wikipedia.org/w/index.php?title=Cache_replacement_policies&oldid=883636242, download date Mar. 14, 2019, 7 pages.

* cited by examiner

CACHE MANAGEMENT DEVICE, SYSTEM AND METHOD

BACKGROUND

Technical Field

The present disclosure generally relates to memory management in processing cores and, more specifically, to cache replacement algorithms.

Description of the Related Art

Processing cores and devices including processing cores, such as processors, mobile phones, tables, laptops, desktops, embedded processing systems, etc., may typically include one or more cache memories (e.g., instruction cache memories, data cache memories, processor cache memories, combined cache memories, etc.), which may be implemented, for example, using one or more random access memories (RAM). A cache memory temporarily stores codes or data which may be likely to used by a processing core in the future, such as codes or data that was recently used. A cache replacement algorithm facilitates replacing code and data which is less likely to be used in the future with code and data that is more likely to be used in the future. Conventionally, either a random replacement algorithm or a least recently used (LRU) algorithm is employed.

BRIEF SUMMARY

In an embodiment, a device comprises: a memory array having a plurality of ways and a plurality of address lines; and cache control circuitry, coupled to the memory array, and which, in operation, responds to a cache miss associated with an address line of the plurality of address lines by: selecting a way of the plurality of ways based on a first control variable indicating a way of the plurality of ways and a set of second control variables associated with the address line and with respective ways of the plurality of ways; writing data associated with the cache miss to the selected way; setting, based on the set of second control variables, variables of the set of second control variables associated with ways other than the selected way; setting a variable of the set of second control variables associated with the selected way to indicate the address line of the selected way was recently replaced; and setting the first control variable to indicate the selected way; and responds to a cache hit associated with the address line by: maintaining current values of the first control variable and of the set of second control variables. In an embodiment, the memory array is organized into four ways. In an embodiment, the first control variable indicates a way of the plurality of ways which was most recently replaced. In an embodiment, the set of second control variables indicate whether the associated way of the plurality of ways was recently replaced. In an embodiment, the selecting a way of the plurality of ways based on the first control variable and the set of second control variables comprises: determining whether all of the variables of the set of second control variables indicate the associated way was recently replaced; in response to a determination that all of the variables of the set of second control variables indicate the associated way was recently replaced, selecting a way other that the way indicated by the first control variable; and in response to a determination that not all of the variables of the set of second control variables indicate the associated way was recently replaced, identifying a second control variable which does not indicate the associated way was recently replaced and selecting the way associated with the identified second control variable. In an embodiment, the identifying a second control variable which does not indicate the associated way was recently replaced comprises starting with a second control variable associated with a way other than the way identified by the first control variable. In an embodiment, the second control variables associated with ways other than the way identified by the first control variable are sequentially evaluated. In an embodiment, the second control variables of ways other than the way identified by the first control variable are randomly evaluated. In an embodiment, the setting, based on the set of second control variables, variables of the set of second control variables associated with ways other than the selected way comprises: determining whether all of the variables of the set of second control variables indicate the associated way was recently replaced; and in response to a determination that all of the variables of the set of second control variables indicate the associated way was recently replaced, resetting variables of the set of second control variables of the address line associated with ways other than the selected way. In an embodiment, the set of second control variables associated with the address line are stored in one-bit fields of respective ways of the address line. In an embodiment, the first control variable is stored in a two-bit flip-flop.

In an embodiment, a system comprises: a processing core; and a cache memory coupled to the processing core, the cache memory including: a cache memory array having a plurality of ways and a plurality of address lines; and control circuitry, coupled to the cache memory array, and which, in operation, responds to a cache miss associated with an address line of the plurality of address lines by: selecting a way of the plurality of ways based on a first control variable indicating a way of the plurality of ways and a set of second control variables associated with the address line and with respective ways of the plurality of ways; writing data associated with the cache miss to the selected way; setting, based on the set of second control variables, variables of the set of second control variables associated with ways other than the selected way; setting a variable of the set of second control variables associated with the selected way to indicate the address line of the selected way was recently replaced; and setting the first control variable to indicate the selected way; and responds to a cache hit associated with the address line by: maintaining current values of the first control variable and of the set of second control variables. In an embodiment, the first control variable indicates a way of the plurality of ways which was most recently replaced and the set of second control variables indicate whether the associated way of the plurality of ways was recently replaced. In an embodiment, the selecting a way of the plurality of ways based on a first control variable and a set of second control variables comprises: determining whether all of the variables of the set of second control variables indicate the associated way was recently replaced; in response to a determination that all of the variables of the set of second control variables indicate the associated way was recently replaced, selecting a way other that the way indicated by the first control variable; and in response to a determination that not all of the variables of the set of second control variables indicate the associated way was recently replaced, identifying a second control variable which does not indicate the associated way was recently replaced and selecting the way associated with the identified second control variable. In an embodiment, the setting, based on the set of second control variables, variables of the set of second control variables associated with ways other than the selected way comprises: determining whether all of the variables of the set of second control variables indicate the associated way was recently replaced; and in response to a determination that all of the variables of the set of second control variables indicate the respective way was recently replaced, resetting variables of the set of second control variables associated with ways other than the selected way. In an embodiment, the system comprises a primary memory coupled to the processing core and to the cache memory.

In an embodiment, a method comprises: responding, by a cache memory organized into a plurality of ways and a plurality of address lines, to a cache miss associated with an address line of a plurality of address lines by: selecting a way of the plurality of ways based on a first control variable indicating a way of the plurality of ways and a set of second control variables associated with the address line and with respective ways of the plurality of ways; writing data associated with the cache miss to the selected way; setting, based on the set of second control variables, variables of the set of second control variables associated with ways other than the selected way; setting a variable of the set of second control variables associated with the selected way to indicate the address line of the selected way; and setting the first control variable to indicate the selected way; and responding, by the cache memory, to a cache hit associated with the address line by: maintaining current values of the first control variable and of the set of second control variables. In an embodiment, the first control variable indicates a way of the plurality of ways which was most recently replaced and the set of second control variables indicate whether an associated way of the plurality of ways was recently replaced. In an embodiment, the selecting a way of the plurality of ways based on a first control variable and a set of second control variables comprises: determining whether all of the variables of the set of second control variables indicate the associated way was recently replaced; in response to a determination that all of the variables of the set of second control variables indicate the associated way was recently replaced, selecting a way other that the way indicated by the first control variable; and in response to a determination that not all of the variables of the set of second control variables indicate the associated way was recently replaced, identifying a second control variable which does not indicate the associated way was recently replaced and selecting the way associated with the identified second control variable.

In an embodiment, a non-transitory computer-readable medium has contents which cause a cache memory organized into a plurality of ways and a plurality of address lines to perform a method, the method comprising: responding to a cache miss associated with an address line of a plurality of address lines by: selecting a way of the plurality of ways based on a first control variable indicating a way of the plurality of ways and a set of second control variables associated with the address line and with respective ways of the plurality of ways; writing data associated with the cache miss to the selected way; setting, based on the set of second control variables, variables of the set of second control variables associated with ways other than the selected way; setting a variable of the set of second control variables associated with the selected way to indicate the address line of the selected way was recently replaced; and setting the first control variable to indicate the selected way; and responding, by the cache memory, to a cache hit associated with the address line by: maintaining current values of the first control variable and of the set of second control variables. In an embodiment, the first control variable indicates a way of the plurality of ways which was most recently replaced and the set of second control variables indicate whether a respective way of the plurality of ways of the address line was recently replaced. In an embodiment, the selecting a way of the plurality of ways based on a first control variable and a set of second control variables comprises: determining whether all of the variables of the set of second control variables indicate the associated way was recently replaced; in response to a determination that all of the variables of the set of second control variables indicate the associated way was recently replaced, selecting a way other that the way indicated by the first control variable; and in response to a determination that not all of the variables of the set of second control variables indicate the associated way was recently replaced, identifying a second control variable which does not indicate the associated way was recently replaced and selecting the way associated with the identified second control variable.

DETAILED DESCRIPTION

Figure 1:
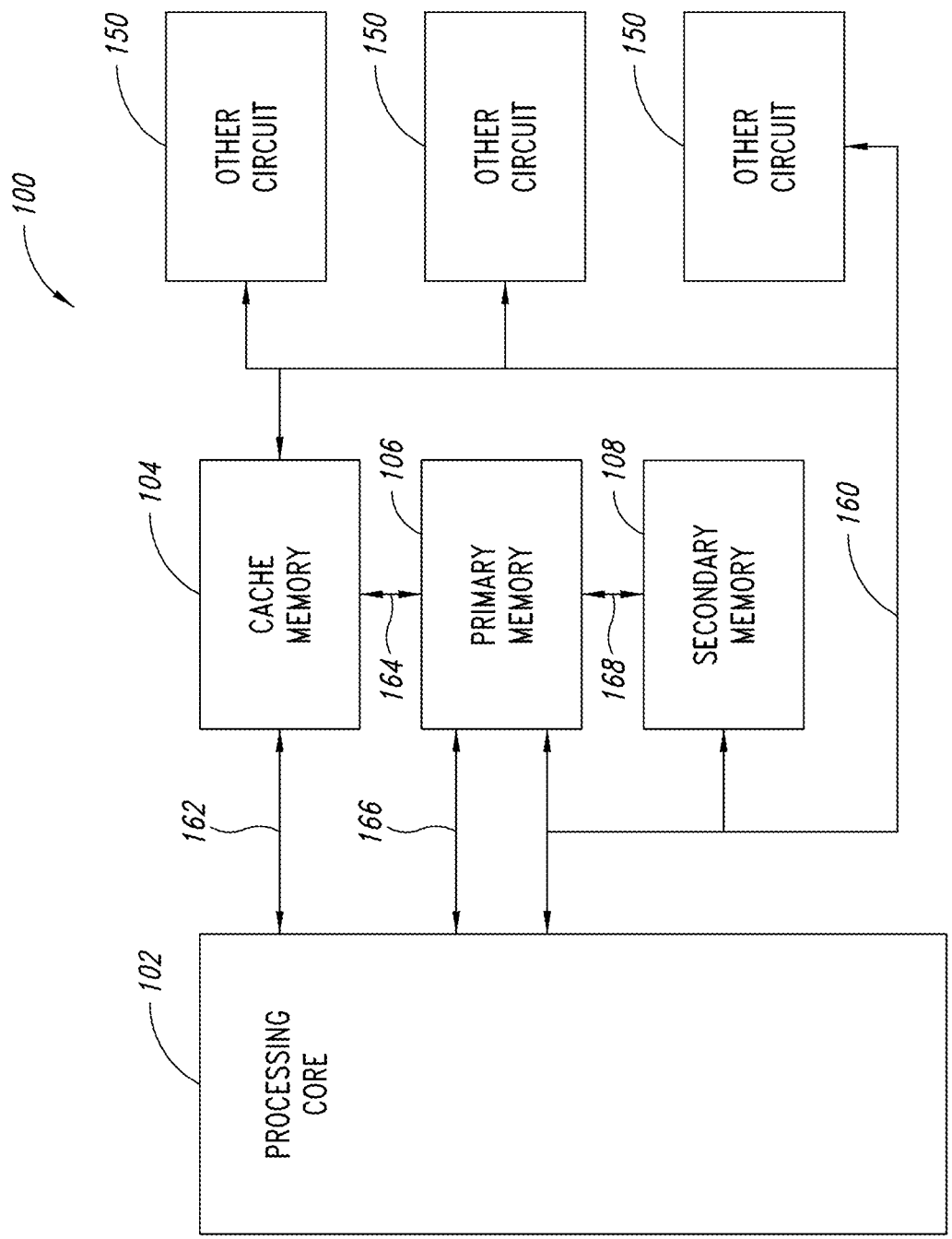
FIG. 1 is a functional block diagram of an embodiment of an electronic device or system having a processing core and a cache memory according to an embodiment.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, circuits, such as transistors, multipliers, adders, dividers, comparators, transistors, integrated circuits, logic gates, finite state machines, memories, interfaces, bus systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

FIG. 1 is a functional block diagram of an embodiment of an electronic device or system 100 of the type to which the embodiments which will be described may apply. The system 100 comprises one or more processing cores or circuits 102. The processing core 102 may comprise, for example, one or more processors, a state machine, a microprocessor, a programmable logic circuit, discrete circuitry, logic gates, registers, etc., and various combinations thereof. The processing core may control overall operation of the system 100, execution of application programs by the system 100, etc. The system 100 includes one or more memories, such as one or more volatile and/or non-volatile memories which may store, for example, all or part of instructions and data related to applications and operations performed by the system 100. As illustrated, the system 100 includes a cache memory 104, a primary memory 106, and a secondary memory 108. The system 100 includes one or more other circuits 150, which may include interfaces, transceivers, antennas, power supplies, etc., and a main bus system 160, which may include one or more data, address, power and/or control buses coupled to the various components of the system 100. As illustrated, the system 100 includes additional bus systems such as bus system 162, which communicatively couples the cache memory 104 and the processing core 102, bus system 164, which communicatively couples the cache memory 104 and the primary memory 106, bus system 166, which communicatively couples the primary memory 106 and the processing core 102, and bus system 168, which communicatively couples the primary memory 106 and the secondary memory 108.

In some embodiments, the system 100 may include more components than illustrated, may include fewer components than illustrated, may split illustrated components into separate components, may combine illustrated components, etc., and various combinations thereof. For example, the secondary memory 108 may comprise an external memory coupled to the system 100 through an interface, in addition to or instead of an internal secondary memory.

The primary memory 106 is typically the working memory of the system 100 (e.g., the memory upon which the processing core 102 works), and may typically be a volatile memory of a limited size. The secondary memory 108 may typically a non-volatile memory, which stores instructions and data which may be retrieved and stored in the primary memory when needed by the system 100. The cache memory 104 is a relatively fast memory compared to the secondary memory 108 and typically has a limited size which may be larger than a size of the primary memory 106.

The cache memory 104 temporarily stores code and data for later use by the system 100. Instead of retrieving needed code or data from the secondary memory 108 for storage in the primary memory 104, the system 100 may check the cache memory 104 first to see if the data or code is already stored in the cache memory 104. A cache memory 104 may significantly improve performance of a system, such as the system 100, by reducing the time and other resources needed to retrieve data and code for use by the system 100. When code and data are retrieved (e.g., from the secondary memory 108) for use by the system 100, or when data or code are written (e.g., to the primary memory 106 or to the secondary memory 108), a copy of the data or code may be stored in the cache memory 104 for later use by the system 100. When the needed data or code is found in the cache, this is known as a hit. When the needed data or code is not found in the cache, this is known as a miss. For convenience, reference to data stored in a cache may also refer to code stored in a cache.

A cache replacement algorithm facilitates replacing code and data which is less likely to be used in the future with code and data that is more likely to be used in the future. Conventionally, either a random replacement algorithm or a least recently used (LRU) algorithm is employed as a cache replacement algorithm.

Figure 2:
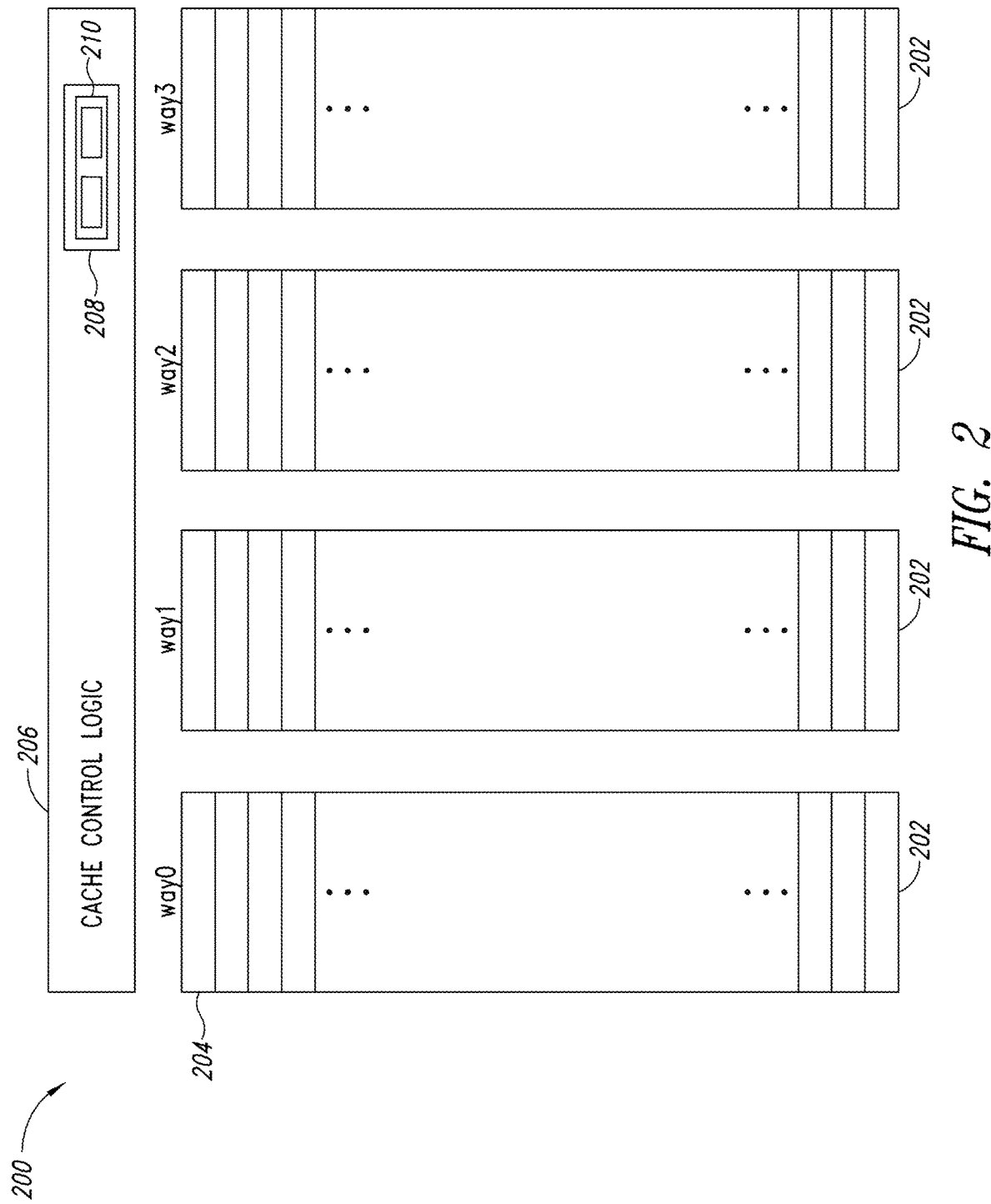
FIG. 2 illustrates an embodiment of a 4-way cache memory employing random cache replacement.

An example structure for a 4-way cache memory 200 using random replacement is shown in FIG. 2. The cache memory 200 comprises four ways 202, each having a number of lines 204, and cache control logic or circuitry 206. The cache control logic 206 as illustrated comprises a random number generator 208, which as illustrated is implemented using a 2-bit flip-flop 210. In a random replacement algorithm, a way of a cache is randomly selected and replaced. The random number generator 210 is updated with every clock cycle, and a value stored in the flip-flop is used to pick a way to replace in the event of a miss. Random replacement has low costs in terms of area and in terms of power to implement the selection process. However, there are high costs in terms of a high miss rate and frequent cache refilling, which leads to high power consumption.

Figure 3:
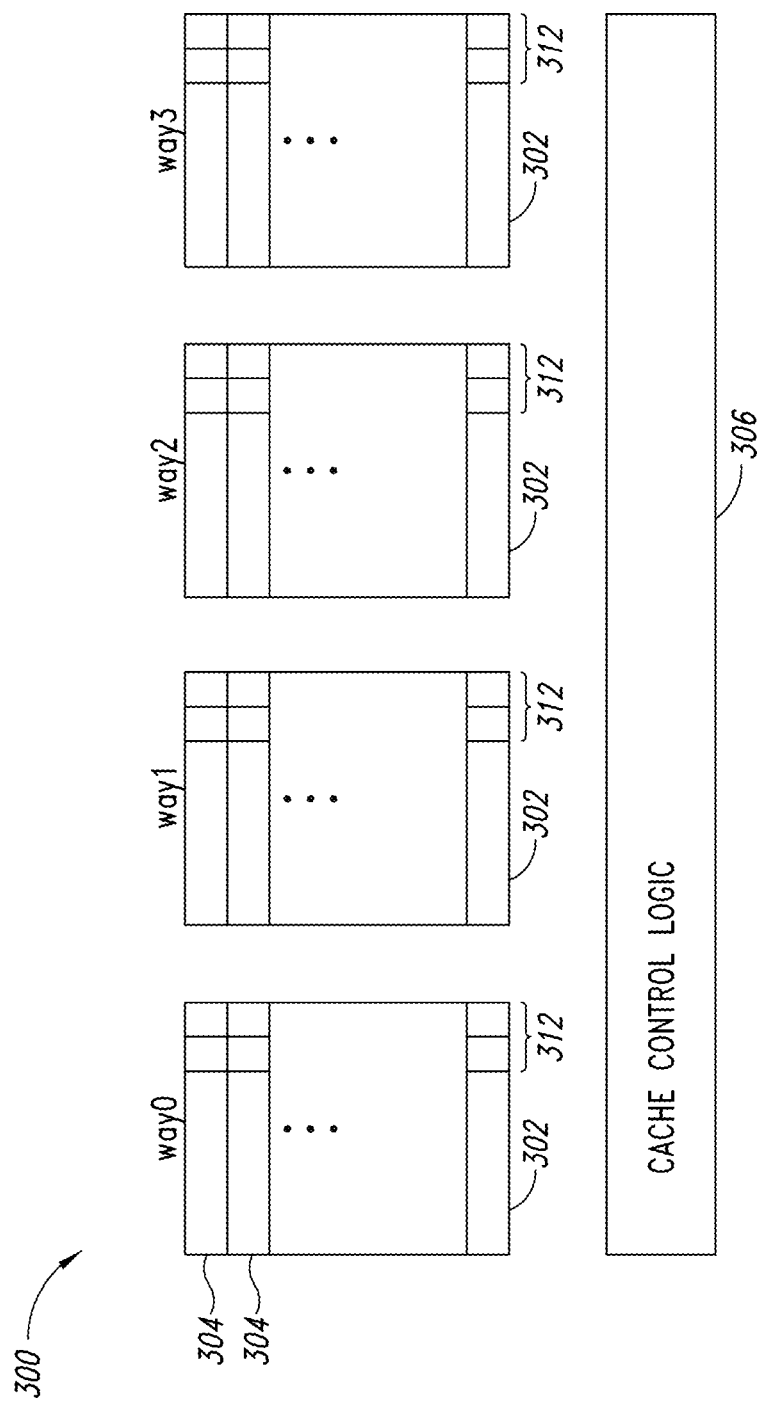
FIG. 3 illustrates an embodiment of a 4-way cache memory employing least recently used (LRU) cache replacement.

An example structure for a 4-way cache memory 300 using an LRU replacement algorithm is shown in FIG. 3. In an LRU algorithm, use of the ways is tracked and the least-recently used way is replaced. The cache 300 comprises four ways 302, each having a number of lines 304, and cache control logic or circuitry 306. Each line 304 of each way 302 includes 2 bits 312 used to record the use information, which is updated in each way 302 for each read and write to the line. The 2 bits 312 may be referred to as a cut in the memory. Alternatively, a separate memory may be employed to store the use information. When a miss occurs, the use data for each way of the line is compared and the least-recently used way is selected. The data in the selected way is replaced with the new data. The 2-bits of data are updated for each way of the line to reflect that the selected way is the most recently used way and to update the use information for the other ways (e.g., the bits for the selected way are set to [1,1]), the bits for the way which was previously set to [1, 1] are updated to [1, 0], the bits for the way which was previously set to [1, 0] are updated to [0, 1], the bits for the way which was previously set to [0, 1] are updated to [0, 0]). When a hit occurs, the bits of the way of the hit are updated to reflect the way is the most recently used way of the line, and the other bits of the other ways are updated accordingly. An LRU replacement algorithm has a low miss rate, but at the cost of high memory area and power consumption by the LRU replacement algorithm which updates the use information (e.g., two bits of information for each of the four ways of a line) for each read and write to the line of the cache.

The inventor has realized that instead of tracking the least-recently-used (LRU) way, which requires updating stored use history information for all the ways each time an address line is used, tracking the most-recently-replaced (MRR) way may be more efficient. Less information needs to be stored than in an LRU replacement scheme, and stored information may be updated as appropriate with each miss, rather than needing to be updated with each read and write to the cache. An embodiment of MRR cache replacement facilitates providing a lower miss rate than random replacement, while using less memory and power than an LRU replacement. In an embodiment, MRR cache replacement has a miss rate similar to LRU replacement with power consumption similar to random replacement.

Figure 4:
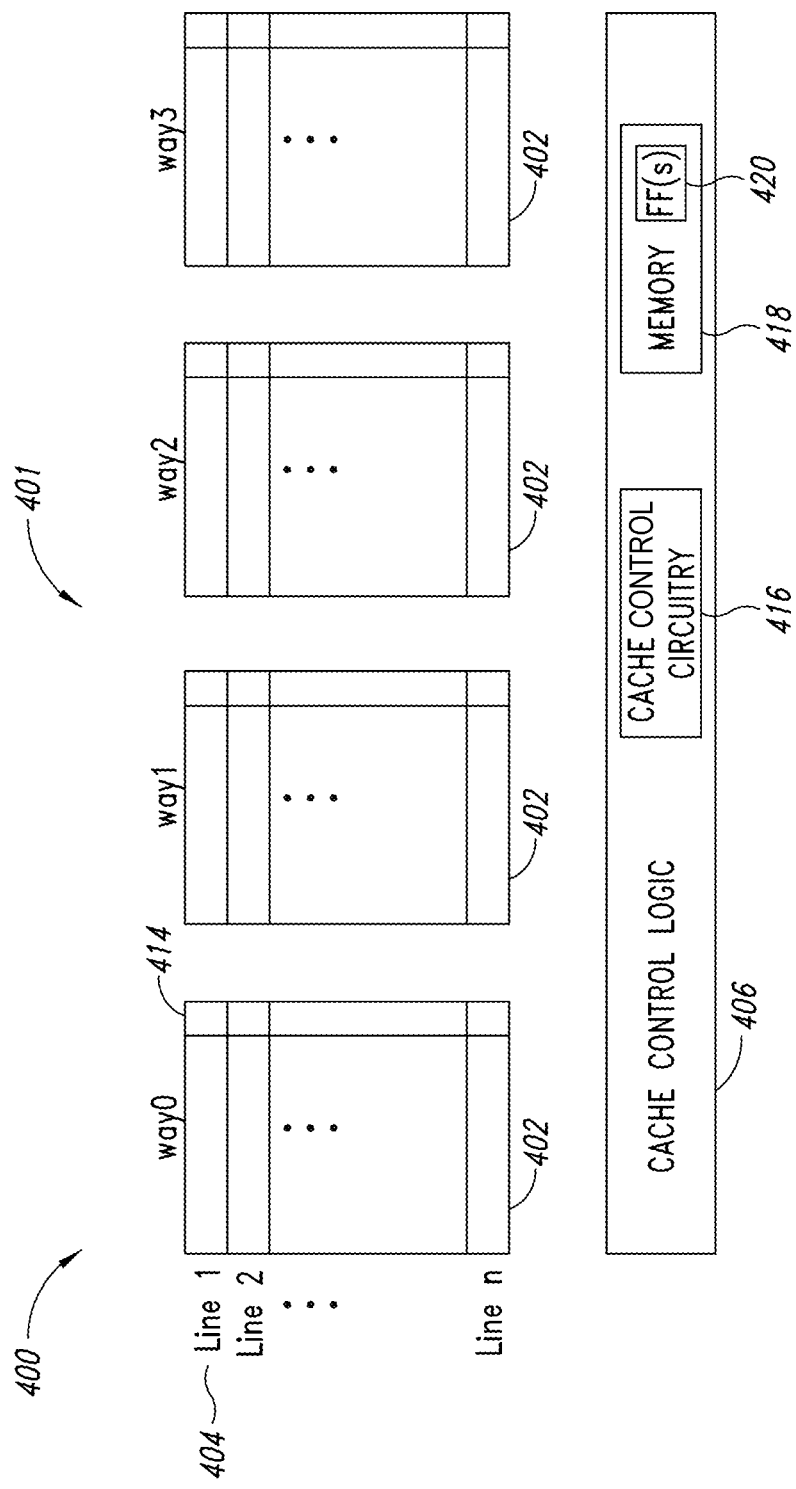
FIG. 4 illustrates an embodiment of a 4-way cache memory employing an embodiment of most recently replaced (MRR) cache replacement.

FIG. 4 illustrates an embodiment of a 4-way cache memory 400, which, in operation, may use an embodiment of MRR cache replacement to manage replacement of ways of a line in the cache memory 400. An embodiment of the cache memory 400 may be employed, for example, as the cache memory 104 in the system 100 of FIG. 1.

The cache memory 400 comprises a memory array 401 organized into (e.g., logically, physically, or both) four ways 402, each way having a number of address lines 404, and cache control logic or circuitry 406. The memory array 401 may be conceptually viewed as an array organized into columns (ways) and rows (lines). As illustrated, each line 404 of each way 402 includes a bit 414 used to record whether the line 404 of the way 402 was recently replaced (an RR bit to store a control variable, collectively, the RR bits storing a set of control variables each associated with the line and a respective way), which may be updated less frequently than the least-recently-used information stored for use in LRU replacement. The bit 414 of line 404 of a way 402 is set when the data stored in the line 404 of the way 402 is replaced in the event of a miss, and may be reset in the event of a miss when the data stored in the line 404 of the way 402 is not replaced, as discussed in more detail below. Alternatively, a separate memory of the cache 400 (e.g., memory 418) may be employed to store the recently replaced information, such as to store a data array including a set of control variables for each line of the memory array 401.

The cache control logic 406 comprises control circuitry 416 and a memory 418, which as illustrated comprises one or more two-bit flip-flops 420, to record one or more most recently replaced (MRR) indicators or control variables An MRR indicator is an indication of a way of the set of ways which was most recently replaced (way_MRR). In an embodiment, a single way_MRR indicator may be stored, for example, in a single two-bit flip-flop, which is updated to indicate the most recently replaced way when any line in the way is replaced. In an embodiment, additional way_MRR indicators may be stored, for example, in additional flip-flops, each way_MRR indicator corresponding to a set of lines of the corresponding way and indicating one of the ways as the most recently replaced way for the set of lines. In an embodiment, a set of way_MRR indicators may be stored, for example, in flip-flops, each way_MRR indicator corresponding to a line of the way. An improved miss rate may be obtained by storing a single MRR value for a set of ways. Storing more than one MRR indicator for a set of ways (e.g., one stored way_MRR indicator for the first N/2 lines of ways having N lines, and one stored way_MRR indicator for the next N/2 lines) facilitates further reducing the miss rate, at the cost of additional area for additional storage.

The control circuitry 406 maintains the way_MRR values, which may be viewed as a set of one or more first control variables, values of a respective variable of the first set of control variables indicating a way of the plurality of ways associated with one or more address lines. The control circuitry 406 also maintains the RR bits, as illustrated, one for each line of each way, which may be viewed as a set of second control variables, values of respective second control variable indicating a replacement status of the line of the way associated with the variable. Default values or random values may be set at startup or in response to a reset.

In some embodiments, the cache 400 may include more components than illustrated, may include fewer components than illustrated, may split illustrated components into separate components, may combine illustrated components, etc., and various combinations thereof. For example, the memory 418 cache 400 may include memory dedicated to storing the recently replaced information of the lines 404 of the ways 402, instead of including a bit in each line 404 of each way 402 to store the recently replaced information. In another example, the cache memory may employ more or fewer ways than four.

Figure 5:
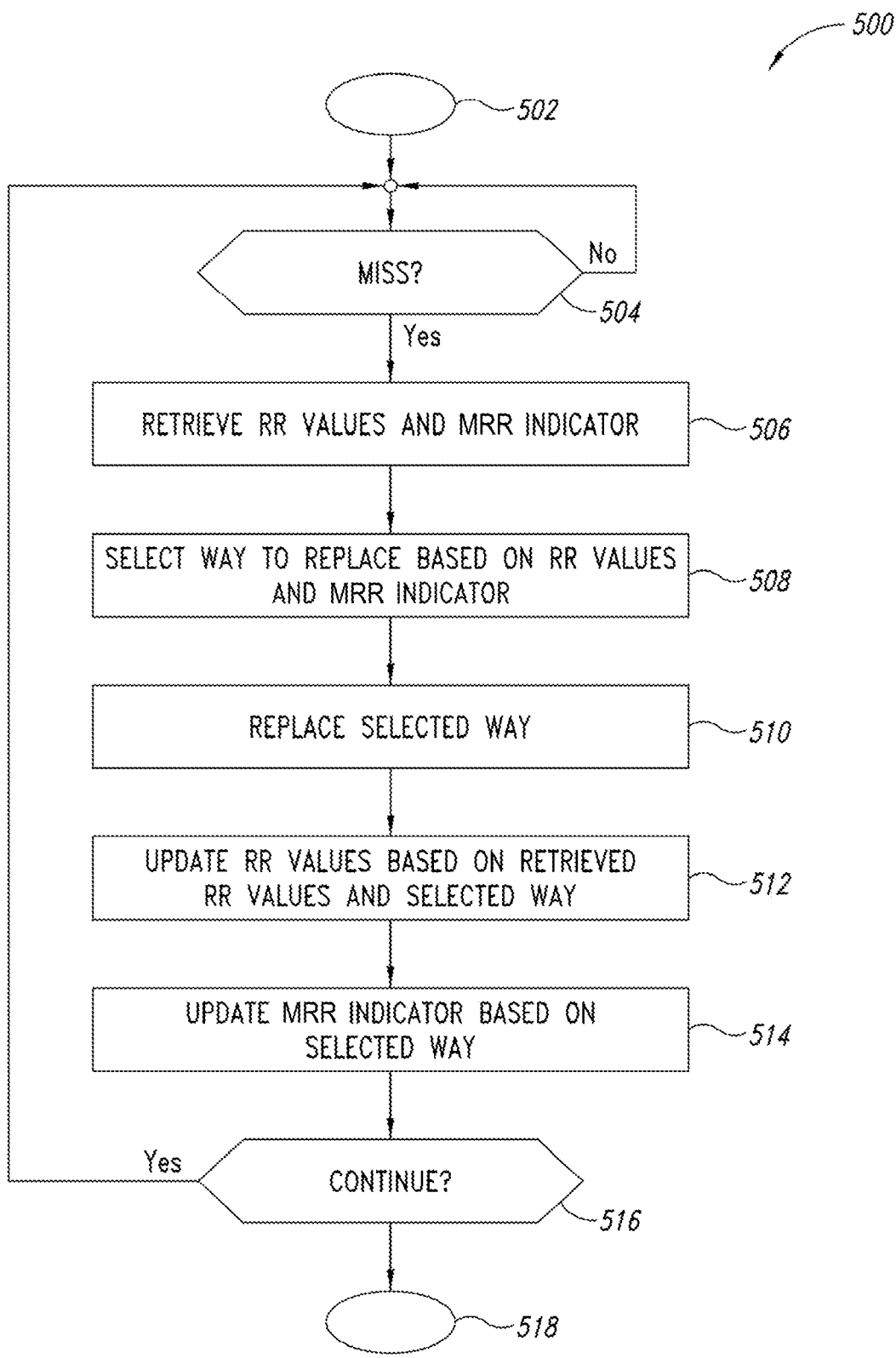
FIG. 5 illustrates an embodiment of a method of managing replacement of data in a cache memory.

FIG. 5 illustrates an embodiment of a method 500 of managing replacement of data in a cache memory by tracking a most recently replaced way in a line, which will be described for convenience with reference to the system 100 of FIG. 1 and the cache memory 400 of FIG. 4. The method 500 starts at 502 and proceeds to 504. The method 500 may be started, for example, in response to an attempt to read a line 404 in the cache 400.

At 504, the method 500 determines whether an attempt to access an address line 404 in the cache memory 400 was a miss. For example, the cache control logic 406 of the cache memory 400 may determine whether an attempt to access an address line 404 in the cache memory 400 was a miss. It is noted that the cache control logic 406 may perform other cache management functions, such as controlling the output of data from the cache memory 400 in the event of a hit, etc.

When it is not determined at 504 that an attempt to access an address line in the cache memory was a miss, the method returns to 504 to wait for the next attempt to access a line in the cache memory 400. The stored information (e.g., control variables) indicating whether the associated ways were recently replaced and whether a way is the most recently replaced way do not need to be updated, and the current values may be maintained.

When it is determined at 504 that an attempt to access an address line in the cache memory was a miss, the method 500 proceeds from 504 to 506. At 506, the method 500 retrieves values of a set of RR bits or control variables of the ways 402 associated with the line of the miss and a value of the MRR indicator (e.g., the control variable way_MRR) associated with the line of the miss. For example, the cache control circuitry 416 may retrieve the values of the bits 414 for the line 404 associated with the miss and the value stored in a flip-flop in the one or more flip-flops 420 storing one or more MRR indicators (e.g., an MRR indicator associated with the array 401, an MRR indicator associated with a subset of lines of the array, etc). To simplify the discussion, the embodiment of FIG. 5 is discussed assuming a single MRR indicator is stored for the set of ways (e.g., an MRR indicator is associated with all of the lines of the array). The method 500 proceeds from 506 to 508.

Figure 6:
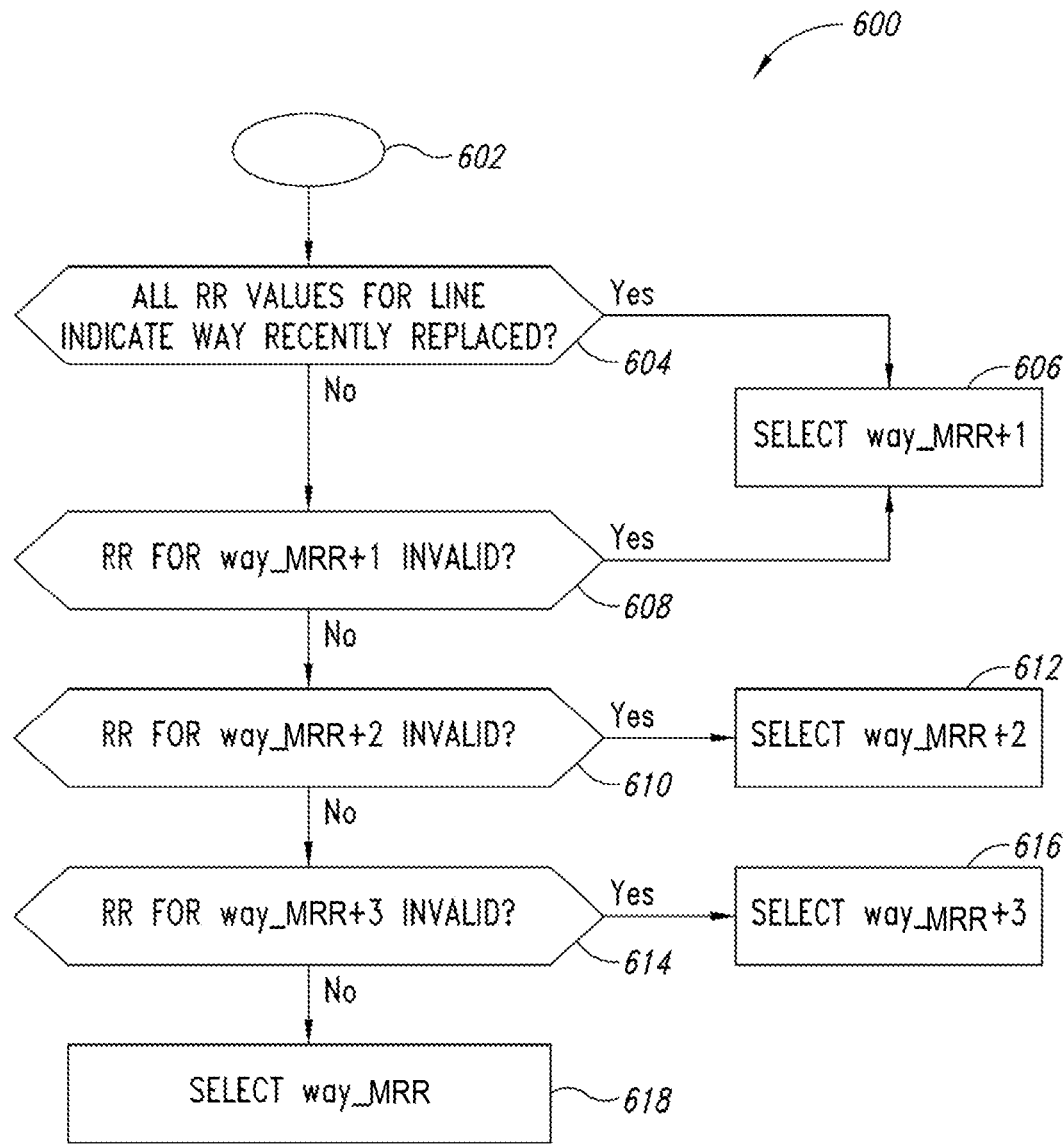
FIG. 6 illustrates an embodiment of a method of selecting a way in a cache memory in which to store data in response to a cache miss.

At 508, the method 500 determines or selects a way 402 in which to store data associated with the miss in the line 404 based on the retrieved RR values associated with the line of the miss and the retrieved MRR indicator. This may be done, for example, in a manner which selects a way which has not been recently replaced, if at least one of the ways has not been recently replaced, and which selects a way other than the way indicated by the MRR indicator when all of the RR values indicate the associated line of the way was recently replaced. FIG. 6 illustrates an embodiment of a method or subroutine 600 that may be employed by the method 500 to select a way 402 in which to store the data. The method 500 proceeds from 508 to 510.

At 510, the method 500 replaces the data in the line 404 of the selected way 402. This may be done in a conventional manner, and may be performed, for example, under the control of the cache control logic 406, the processor core 102, the primary memory 106, and various combinations thereof. The method 500 proceeds from 510 to 512.

At 512, the method 500 updates the RR values associated with the line based on the retrieved RR values and the way selected at 510. For example, if all of the retrieved RR values are set to indicate the line 404 of the respective way was recently replaced (e.g., all the RR bits associated with the line are set valid (e.g., 1)), the RR values of the set of RR values associated with ways other than the selected way may be updated to indicate the line of the associated way was not recently replaced (e.g., the bits associated with the line in the unselected ways are reset to invalid (e.g., set to 0)), and the RR value of the selected way may be set to indicate the selected way was recently replaced. If not all of the retrieved RR values are set to indicate the line 404 of the associated way was recently replaced, the RR value of the selected way may be set to indicate the selected way was recently replaced, and the RR values of the unselected ways may be left unchanged. The method 500 proceeds from 512 to 514.

At 514, the method 500 updates the MRR indicator value to indicate the way selected at 508 is the most recently replaced way associated with the line (e.g., replaces the variable way_MRR with a value associated with the selected way). This may be done, for example, by setting the flip-flop 420 to a value associated with the selected way (e.g., with reference to FIG. 4, to [0,0] to indicate way0, to [0,1] to indicate way1, to [1,0] to indicate way2, and to [1,1] to indicate way3). The method 500 proceeds from 514 to 516.

At 516, the method 500 determines whether to continue. When it is determined at 516 to continue, the method 500 returns to 504 to wait for the next attempt to access data in a line of the cache memory. When it is not determined at 516 to continue, the method 500 proceeds from 516 to 518, where the method may terminate, for example, in response to a reset command.

Embodiments of methods of managing replacement of data in a cache memory may contain additional acts not shown in FIG. 5, may not contain all of the acts shown in FIG. 5, may perform acts shown in FIG. 5 in various orders, and may be modified in various respects. For example, the method 500 may perform at 514 before or in parallel with performing act 512, may include an additional act of determining whether all the retrieved RR values are set valid, etc.

FIG. 6 illustrates an embodiment of a method or subroutine 600 that may be employed by the method 500 to select a way 402 in which to store data in response to a cache miss. FIG. 6 will be described for convenience with reference to the system 100 of FIG. 1, the cache memory 400 of FIG. 4 and the method 500 of FIG. 5.

The method 600 starts at 602 and proceeds to 604. The method 600 may start, for example, in response to a call from act 508 of the method 500 of FIG. 5.

At 604, the method 600 determines whether all of RR values associated with the line for which a miss occurred indicate the data in the line of the way was recently replaced (e.g., all of the RR values of the set of RR values associated with the line are set to valid). When it is determined at 604 that all of the RR values indicate the data in the line of the way was recently replaced, the method proceeds to 606, where one of the ways other than the most recently replaced way (e.g., a way other than the way associated with the retrieved value of way_MRR) is selected. As illustrated, at 606 the next way in sequence is selected (e.g., the way corresponding to the value of way_MRR plus 1 is selected and the value of way_MRR+1 is returned to the calling program to indicate the next way in sequence is selected).

When it is not determined at 604 that all of the RR values associated with the line for which a miss occurred indicate the data in the line of the way was recently replaced (e.g., at least one of the RR values associated with the line is set to invalid), the method proceeds to 608.

At 608, the method 600 determines whether the RR value associated with one of the ways other than the most recently replaced way (e.g., a way other than the way associated with the retrieved value of way_MRR) does not indicate the way was recently replaced. As illustrated, at 608 the method determines whether the RR value associated with the next way in sequence (e.g., the RR value associated with way_MRR+1) does not indicate the way was recently replaced (e.g., the RR value or bit is invalid). When it is determined at 608 that the RR value associated with the next way in sequence does not indicate the way was recently replaced, the method proceeds from 608 to 606, where the value of way_MRR+1 is returned to indicate the next way in sequence is the selected way. When it is not determined at 608 that the RR value associated with the next way in sequence does not indicate the way was recently replaced (e.g., the RR value or bit is valid), the method proceeds from 608 to 610.

At 610, the method 600 determines whether the RR value associated with another of the ways other than the most recently replaced way (as illustrated, a way associated with a value of way_MRR+2) does not indicate the way was recently replaced. When it is determined at 610 that the RR value does not indicate the way was recently replaced, the method proceeds from 610 to 612, where the value of way_MRR+2 is returned to indicate the selected way is the way associated with way_MRR+2. When it is not determined at 610 that the RR value associated with the value of way_MRR+2 does not indicate the way was recently replaced (e.g., the RR value or bit is valid), the method proceeds from 610 to 614.

At 614, the method 600 determines whether the RR value associated with another of the ways other than the most recently replaced way (as illustrated, a way associated with a value of way_MRR+3) does not indicate the way was recently replaced. When it is determined at 614 that the RR value does not indicate the way was recently replaced, the method proceeds from 614 to 616, where the value of way_MRR+3 is returned to indicate the selected way is the way associated with way_MRR+3. When it is not determined at 614 that the RR value associated with the value of way_MRR+3 does not indicate the way was recently replaced (e.g., the RR value or bit is valid), the method proceeds from 614 to 618.

At 618, the value of way_MRR is returned to indicate the selected way is the way associated with the value of way_MRR. It is noted that in some circumstances (e.g., upon startup of the cache memory 400, after a reset, etc.), the RR value or bit of a way associated with the stored value of the MRR indicator (e.g., way_MRR) may be set to indicate the way was not recently replaced (e.g., set invalid), although in normal operation, the RR value of the way associated with the stored value of the MRR indicator would be set to indicate the way was recently replaced.

Embodiments of methods of selecting a way to replace in a cache memory may contain additional acts not shown in FIG. 6, may not contain all of the acts shown in FIG. 6, may perform acts shown in FIG. 6 in various orders, and may be modified in various respects. For example, the method 600 may be modified at 608 to determine whether an RR value associated with a random way other than the way associated with the value of the MRR indicator indicates the random way was not recently replaced, and if so, to select the random way.

Figure 7:
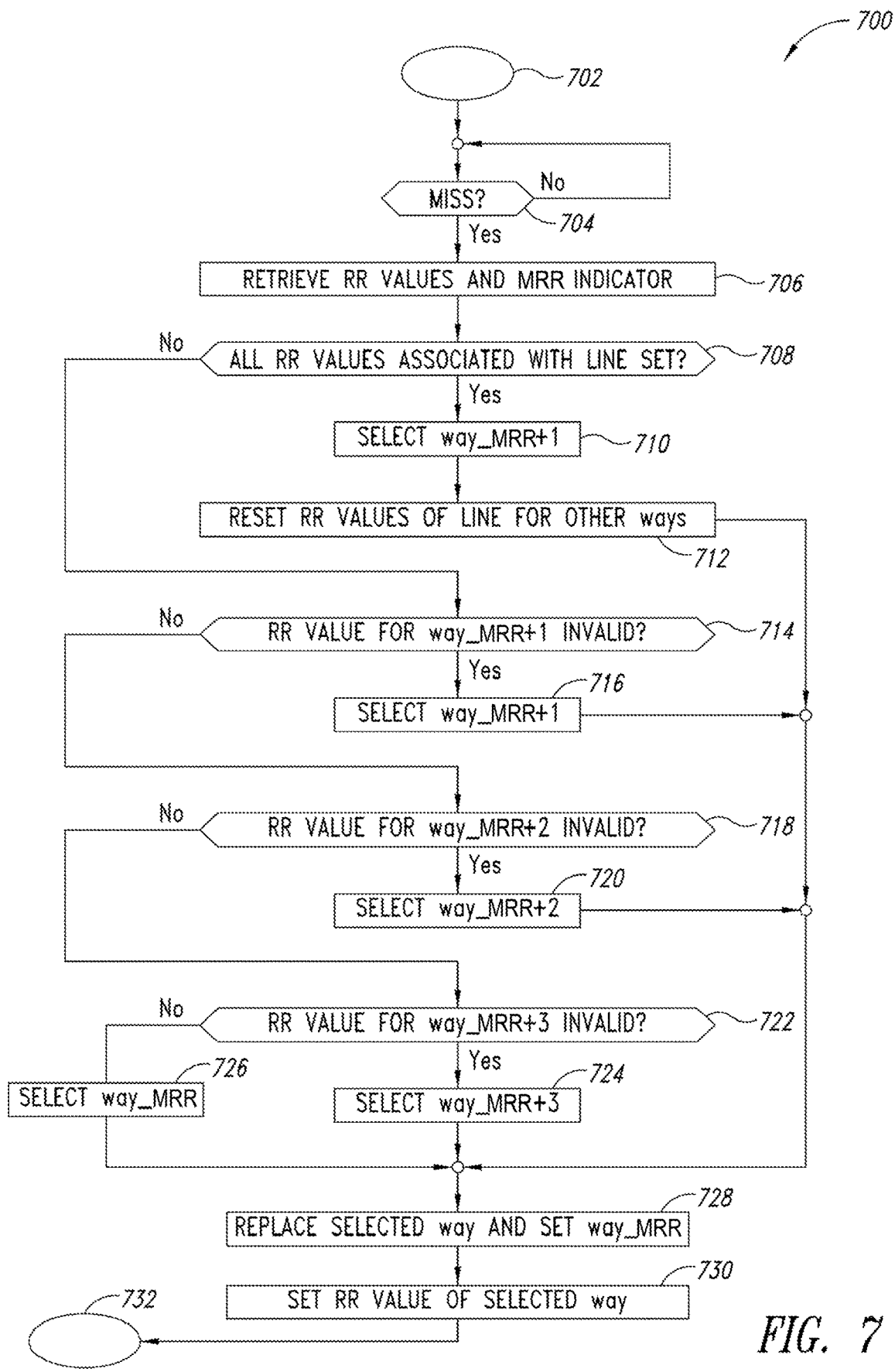
FIG. 7 illustrates an embodiment of a method of managing replacement of data in a cache memory.

FIG. 7 illustrates an embodiment of a method 700 of managing replacement of data in a cache memory by tracking a most recently replaced way in a line, which will be described for convenience with reference to the system 100 of FIG. 1 and the cache memory 400 of FIG. 4. The method 700 starts at 702 and proceeds to 704. The method 700 may be started, for example, in response to an attempt to read one or more lines 404 in the cache 400.

To simplify the discussion, the embodiment of FIG. 7 is discussed assuming a single MRR indicator is stored for the set of ways (e.g., an MRR indicator is associated with all of the lines of the array).

At 704, the method 700 determines whether an attempt to access one or more address lines 404 in the cache memory 400 was a miss. For example, the cache control logic 406 of the cache memory 400 may determine whether an attempt to access an address line 404 in the cache memory 400 was a miss. It is noted that the cache control logic 406 may perform other cache management functions, such as controlling the output of data from the cache memory 400 in the event of a hit, etc.

When it is not determined at 704 that an attempt to access an address line in the cache memory was a miss, the method 700 returns to 704 to wait for the next attempt to access a line in the cache memory 400. The stored information (e.g., control variables) indicating whether the associated ways were recently replaced and whether a way is the most recently replaced way do not need to be updated, and the current values may be maintained.

When it is determined at 704 that an attempt to access an address line in the cache memory was a miss, the method 700 proceeds from 704 to 706. At 706, the method 700 retrieves values of a set of RR bits or control variables of the ways 402 associated with the line of the miss and a value of the MRR indicator associated with the memory array 401. For example, the cache control circuitry 416 may retrieve the values of the bits 414 for the line 404 associated with the miss and the value stored in a flip-flop 420. The method 700 proceeds from 706 to 708.

At 708, the method determines whether all of the RR values associated with the line for which a miss occurred indicate the data in the line of the way was recently replaced (e.g., all of the RR values of the set of RR values associated with the line are set to valid). This determination may be temporarily stored. When it is determined at 708 that all of the RR values of the set of RR values associated with the line are set, the method proceeds from 708 to 710.

At 710, the method 700 selects one of the ways other than the way indicated by the retrieved value of the MRR indicator. As illustrated, the way associated with a value of the MRR indicator plus 1 (way_MRR+1) is selected. However, any of the ways other than the way indicated by the retrieved MRR indicator value may be selected. The method proceeds from 710 to 712.

At 712, the RR values of the line associated with ways other than the select way are reset. In the illustrated embodiment, the RR values for the line corresponding to way_MRR, way_MRR+2 and way_MRR+3 are reset. The method 700 proceeds from 712 to 728.

When it is not determined at 708 that all of the RR values of the set of RR values associated with the line are set, the method proceeds from 708 to 714. At 714, the method 700 determines whether the RR value associated with one of the ways other than the most recently replaced way (e.g., a way other than the way associated with the retrieved value of way_MRR) does not indicate the way was recently replaced (e.g., is invalid). As illustrated, at 714 the method determines whether the RR value associated with the next way in sequence (e.g., the RR value associated with way_MRR+1) does not indicate the way was recently replaced (e.g., the RR value or bit is invalid). Sequential evaluation of the ways will be assumed in the remaining description of FIG. 7 to simplify the discussion. When it is determined at 714 that the RR value associated with the next way in sequence does not indicate the way was recently replaced, the method proceeds from 714 to 716, where the way corresponding to way_MRR+1 is selected. The method 700 proceeds from 716 to 728.

When it is not determined at 714 that the RR value associated with way_MRR+1 is invalid, the method proceeds from 714 to 718. At 718, the method 700 determines whether the RR value associated with the way corresponding to way_MRR+2 is invalid. When it is determined at 718 that the RR value associated with the way corresponding to way_MRR+2 is invalid, the method proceeds from 718 to 720, where the way corresponding to way_MRR+2 is selected. The method 700 proceeds from 720 to 728.

When it is not determined at 718 that the RR value associated with way_MRR+2 is invalid, the method proceeds from 718 to 722. At 722, the method 700 determines whether the RR value associated with the way corresponding to way_MRR+3 is invalid. When it is determined at 722 that the RR value associated with the way corresponding to way_MRR+3 is invalid, the method proceeds from 722 to 724, where the way corresponding to way_MRR+3 is selected. The method 700 proceeds from 724 to 728.

When it is not determined at 722 that RR value associated with the way corresponding to way_MRR+3 is invalid, the method proceeds from 722 to 726, where the way corresponding to way_MRR is selected. The method 700 proceeds from 726 to 728.

At 728, the method 700 replaces the data in the line 404 of the selected way 402 and updates the value of the MRR indicator to indicate the selected way. The replacing of data in the line of the selected way may be done in a conventional manner, and may be performed, for example, under the control of the cache control logic 406, the processor core 102, the primary memory 106, and various combinations thereof. The MRR indicator may be updated by updating the value stored in the 2-bit flip-flop to indicate the selected way. The method 700 proceeds from 728 to 730.

At 730, the method 700 sets the RR value of the line of the selected way. The method 700 proceeds from 730 to 732, where further processing may occur. For example, the method 700 may determine whether to continue.

Embodiments of methods of managing replacement of data in a cache memory may contain additional acts not shown in FIG. 7, may not contain all of the acts shown in FIG. 7, may perform acts shown in FIG. 7 in various orders, and may be modified in various respects. For example, the method 700 may split act 728 into two acts, e.g., replacing the data in the selected way in one act and updating the MRR indicating to indicate the selected way in another act, etc.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a memory array having a plurality of ways and a plurality of address lines; and
cache control circuitry, coupled to the memory array, and which, in operation,
responds to a cache miss associated with an address line of the plurality of address lines by:
selecting a way of the plurality of ways based on a first control variable indicating a way of the plurality of ways and a set of second control variables, each second control variable of the set of second control variables being associated with the address line and with a respective way of the plurality of ways;
writing data associated with the cache miss to the selected way;
setting, based on the set of second control variables, variables of the set of second variables associated with ways other than the selected way;
setting a variable of the set of second control variables associated with the selected way to indicate the address line of the selected way was recently replaced; and
responds to a cache hit associated with the address line by:
maintaining current values of the first control variable and of the set of second control variables.

2. The device of claim 1 wherein the memory array is organized into four ways.

3. The device of claim 1 wherein the first control variable indicates a way of the plurality of ways which was most recently replaced.

4. The device of claim 3 wherein the set of second control variables indicate whether the associated way of the plurality of ways was recently replaced.

5. The device of claim 4 wherein the selecting a way of the plurality of ways based on the first control variable and the set of second control variables comprises:
determining whether all of the variables of the set of second control variables indicate the associated way was recently replaced;
in response to a determination that all of the variables of the set of second control variables indicate the associated way was recently replaced, selecting a way other that the way indicated by the first control variable; and
in response to a determination that not all of the variables of the set of second control variables indicate the associated way was recently replaced, identifying a second control variable which does not indicate the associated way was recently replaced and selecting the way associated with the identified second control variable.

6. The device of claim 5 wherein the identifying a second control variable which does not indicate the associated way was recently replaced comprises starting with a second control variable associated with a way other than the way identified by the first control variable.

7. The device of claim 6 wherein the second control variables associated with ways other than the way identified by the first control variable are sequentially evaluated.

8. The device of claim 6 wherein the second control variables of ways other than the way identified by the first control variable are randomly evaluated.

9. The device of claim 4 wherein the setting, based on the set of second control variables, variables of the set of second control variables associated with ways other than the selected way comprises:
determining whether all of the variables of the set of second control variables indicate the associated way was recently replaced; and
in response to a determination that all of the variables of the set of second control variables indicate the associated way was recently replaced, resetting variables of the set of second control variables of the address line associated with ways other than the selected way.

10. The device of claim 1 wherein the set of second control variables associated with the address line are stored in one-bit fields of respective ways of the address line.

11. The device of claim 1 wherein the first control variable is stored in a two-bit flip-flop.

12. A system, comprising:
a processing core; and
a cache memory coupled to the processing core, the cache memory including:

a cache memory array having a plurality of ways and a plurality of address lines; and control circuitry, coupled to the cache memory array, and which, in operation, responds to a cache miss associated with an address line of the plurality of address lines by:
  selecting a way of the plurality of ways based on a first control variable, the first control variable indicating a way of the plurality of ways, and a set of second control variable, each second control variable of the set of second control variables being associated with the address line and with a respective way of the plurality of ways;
  writing data associated with the cache miss to the selected way;
  setting, based on the set of second control variables, variables of the set of second control variables associated with ways other than the selected way;
  setting a variable of the set of second control variables associated with the selected way to indicate the address line of the selected way was recently replaced; and
  setting the first control variable to indicate the selected way is a most recently replaced way; and responds to a cache hit associated with the address line by:
  maintaining current values of the first control variable and of the set of second control variables.

13. The system of claim 12 wherein the set of second control variables indicate whether the associated way of the plurality of ways was recently replaced.

14. The system of claim 13 wherein the selecting a way of the plurality of ways based on a first control variable and a set of second control variables comprises:
  determining whether all of the variables of the set of second control variables indicate the associated way was recently replaced;
  in response to a determination that all of the variables of the set of second control variables indicate the associated way was recently replaced, selecting a way other that the way indicated by the first control variable; and
  in response to a determination that not all of the variables of the set of second control variables indicate the associated way was recently replaced, identifying a second control variable which does not indicate the associated way was recently replaced and selecting the way associated with the identified second control variable.

15. The system of claim 13 wherein the setting, based on the set of second control variables, variables of the set of second control variables associated with ways other than the selected way comprises:
  determining whether all of the variables of the set of second control variables indicate the associated way was recently replaced; and
  in response to a determination that all of the variables of the set of second control variables indicate the respective way was recently replaced, resetting variables of the set of second control variables associated with ways other than the selected way.

16. The system of claim 12, comprising a primary memory coupled to the processing core and to the cache memory.

17. A method, comprising:
  responding, by a cache memory organized into a plurality of ways and a plurality of address lines, to a cache miss associated with an address line of a plurality of address lines by:
    selecting a way of the plurality of ways based on a first control variable indicating a way of the plurality of ways and a set of second control variables, each second control variable of the set of second control variables being associated with the address line and with a respective way of the plurality of ways;
    writing data associated with the cache miss to the selected way;
    setting, based on the set of second control variables, variables of the set of second control variables associated with ways other than the selected way;
    setting a variable of the set of second control variables associated with the selected way to indicate the address line of the selected way was recently replaced; and
    setting the first control variable to indicate the selected way; and
  responding, by the cache memory, to a cache hit associated with the address line by:
    maintaining current values of the first control variable and of the set of second control variables.

18. The method of claim 17 wherein the first control variable indicates a way of the plurality of ways which was most recently replaced and the set of second control variables indicate whether an associated way of the plurality of ways was recently replaced.

19. The method of claim 18 wherein the selecting a way of the plurality of ways based on a first control variable and a set of second control variables comprises:
  determining whether all of the variables of the set of second control variables indicate the associated way was recently replaced;
  in response to a determination that all of the variables of the set of second control variables indicate the associated way was recently replaced, selecting a way other that the way indicated by the first control variable; and
  in response to a determination that not all of the variables of the set of second control variables indicate the associated way was recently replaced, identifying a second control variable which does not indicate the associated way was recently replaced and selecting the way associated with the identified second control variable.

20. A non-transitory computer-readable medium having contents which cause a cache memory organized into a plurality of ways and a plurality of address lines to perform a method, the method comprising:
  responding to a cache miss associated with an address line of a plurality of address lines by:
    selecting a way of the plurality of ways based on a first control variable indicating a way of the plurality of ways and a set of second control variables, each second control variable of the set of second control variables being associated with the address line and with a respective way of the plurality of ways;
    writing data associated with the cache miss to the selected way;
    setting, based on the set of second control variables, variables of the set of second control variables associated with ways other than the selected way;
    setting a variable of the set of second control variables associated with the selected way to indicate the address line of the selected way was recently replaced; and
    setting the first control variable to indicate the selected way; and
  responding, by the cache memory, to a cache hit associated with the address line by:

maintaining current values of the first control variable and of the set of second control variables.

21. The non-transitory computer-readable medium of claim 20 wherein the first control variable indicates a way of the plurality of ways which was most recently replaced and the set of second control variables indicate whether a respective way of the plurality of ways of the address line was recently replaced.

22. The non-transitory computer-readable medium of claim 21 wherein the selecting a way of the plurality of ways based on a first control variable and a set of second control variables comprises:
- determining whether all of the variables of the set of second control variables indicate the associated way was recently replaced;
- in response to a determination that all of the variables of the set of second control variables indicate the associated way was recently replaced, selecting a way other that the way indicated by the first control variable; and
- in response to a determination that not all of the variables of the set of second control variables indicate the associated way was recently replaced, identifying a second control variable which does not indicate the associated way was recently replaced and selecting the way associated with the identified second control variable.

* * * * *

UNITED STATES PATENT AND TRADEMARK OFFICE
CERTIFICATE OF CORRECTION

PATENT NO. : 10,783,083 B2
APPLICATION NO. : 16/268253
DATED : September 22, 2020
INVENTOR(S) : Xiao Kang Jiao Page 1 of 1

It is certified that error appears in the above-identified patent and that said Letters Patent is hereby corrected as shown below:

On the Title Page

Item (73) ASSIGNEE:
"(73) Assignee: STMICROELECTRONICS (BEIJING) RESEARCH & DEVELOPMENT CO. LTD, Beijing (CN)"
Should read:
--(73) Assignee: STMICROELECTRONICS (BEIJING) R&D CO. LTD, Beijing (CN)--

Signed and Sealed this
Twenty-fifth Day of October, 2022

Katherine Kelly Vidal
*Director of the United States Patent and Trademark Office*